United States Patent [19]

Pullen et al.

[11] Patent Number: 5,039,997

[45] Date of Patent: Aug. 13, 1991

[54] IMPACT-VALVE PRINTHEAD FOR INK JET PRINTING

[75] Inventors: Elaine A. Pullen; Robert I. Keur, both of Elk Grove Village, Ill.; Gerry B. Andeen, Menlo Park, Calif.

[73] Assignee: Videojet Systems International, Inc., Chicago, Ill.

[21] Appl. No.: 651,092

[22] Filed: Jan. 22, 1991

Related U.S. Application Data

[63] Continuation of Ser. No. 431,523, Nov. 3, 1989, abandoned.

[51] Int. Cl.$^5$ ........................ B41J 2/005; G01D 15/18

[52] U.S. Cl. .................................. 346/75; 346/140 R

[58] Field of Search .............. 346/140 R, 75; 400/126

[56] References Cited

U.S. PATENT DOCUMENTS

| | | | |
|---|---|---|---|
| 3,747,120 | 7/1973 | Stemme | 346/75 |
| 3,946,398 | 3/1976 | Kyser et al. | 346/75 |
| 4,383,264 | 5/1983 | Lewis | 346/140 |
| 4,459,601 | 7/1984 | Howkins | 346/140 |
| 4,460,905 | 7/1984 | Thomas | 346/140 |
| 4,576,111 | 3/1986 | Slomianny | 346/140 R |
| 4,611,219 | 9/1986 | Sugitani | 346/140 |
| 4,646,106 | 2/1987 | Howkins | 346/140 R |
| 4,723,131 | 2/1988 | Droit | 346/140 |
| 4,737,802 | 4/1988 | Mielke | 346/140 R |
| 4,742,364 | 5/1988 | Mikalsen | 346/140 R |
| 4,789,871 | 12/1988 | Uddgren | 346/75 |
| 4,797,688 | 1/1989 | Furukawa | 346/75 |
| 4,803,501 | 2/1989 | Mielke | 346/140 R |
| 4,819,009 | 4/1989 | Kniepkamp | 346/75 |

FOREIGN PATENT DOCUMENTS

| | | | |
|---|---|---|---|
| 2905063 | 8/1980 | Fed. Rep. of Germany | 346/140 |
| 0133971 | 10/1980 | Japan | 346/75 |

*Primary Examiner*—Benjamin R. Fuller
*Assistant Examiner*—Alrick Bobb
*Attorney, Agent, or Firm*—Rockey and Rifkin

[57] ABSTRACT

An ink jet chamber communicates with an ink reservoir through an opening in a diaphragm plate. The chamber also includes a nozzle through which ink may be ejected on demand. A mass, such as a ball, is reciprocally driven into the diaphragm plate. The ball, upon striking the diaphragm, closes the chamber opening, pressurizing the ink in the chamber to eject a droplet from the nozzle. The ball is driven by a printer driver wire to which it may be attached. Large arrays may be constructed.

26 Claims, 4 Drawing Sheets

FIG. 4
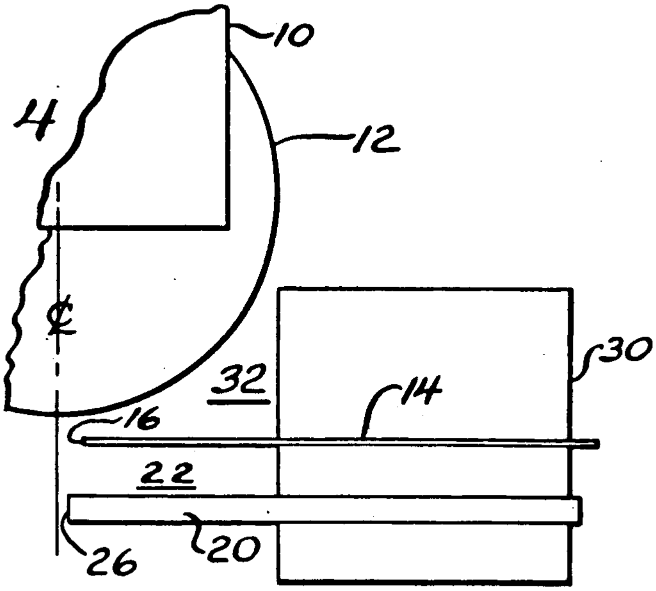
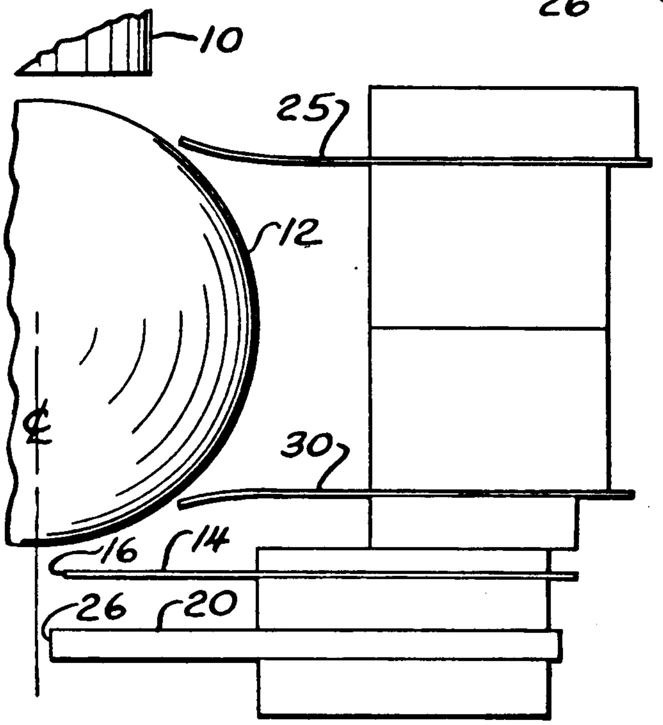
FIG. 5
FIG. 6
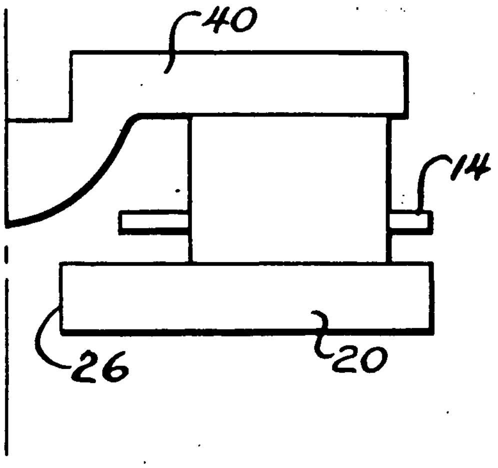

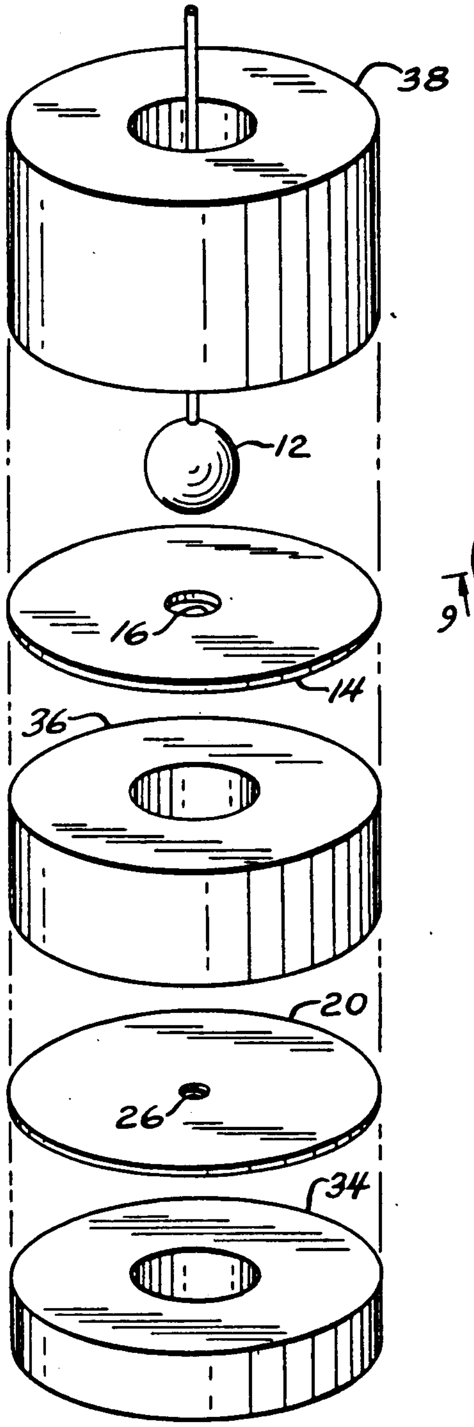
FIG. 7
FIG. 8
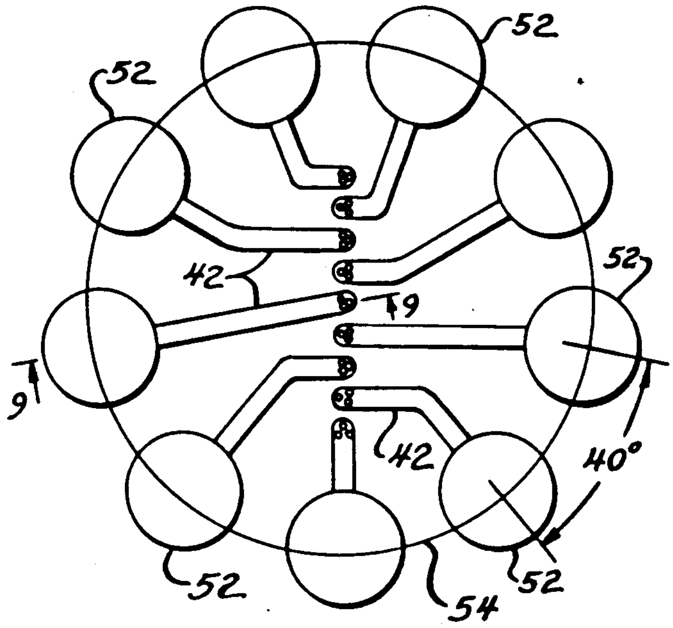
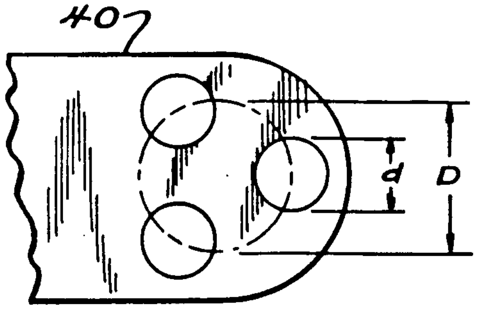
FIG. 8A

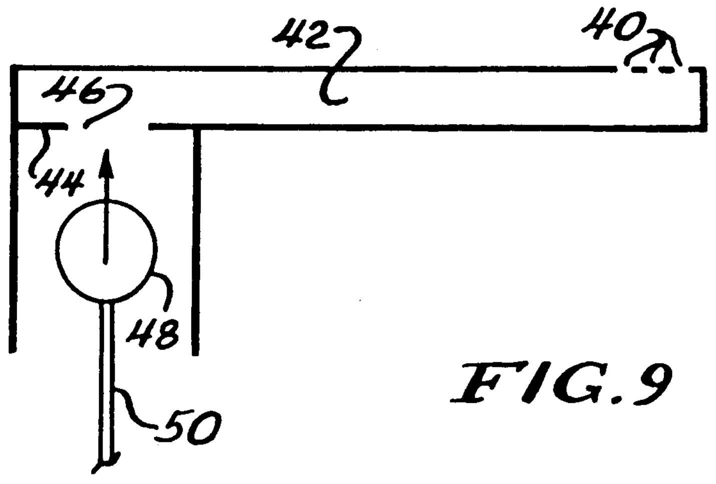
FIG. 9
FIG. 10
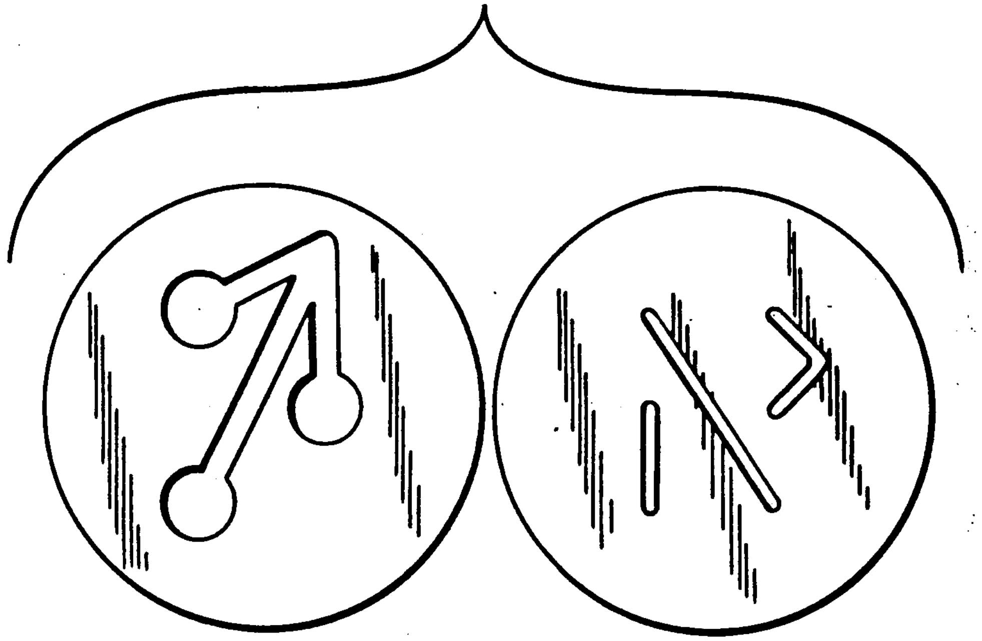

IMPACT-VALVE PRINTHEAD FOR INK JET PRINTING

This is a continuation of copending application Ser. No. 431,523, filed on Nov. 3, 1989, now abandoned.

BACKGROUND OF THE INVENTION

This invention relates to printheads preferably used with drop on demand ink jet printers. Present drop on demand printing devices make use of a variety of mechanisms to generate ink droplets. Some devices use remote solenoid valves to feed nozzles through a length of tubing, others use solenoid valves directly operating at the nozzles or solenoids operating valves at the nozzles connected via rigid or flexible cables. These valve systems generally produce larger drops that are suitable for large character printers typically used to print on cardboard boxes, etc.

There are a number of drawbacks encountered with such devices, particularly when remotely located solenoid valves are employed. These include low frequency response due to slow valve action causing long filaments of fluid (ink) to be ejected from the nozzle; the high cost of the valves and assorted control problems due to the ingestion of air into the nozzle, all of which cause drop marking errors. Finally, such systems require relatively large amounts of power to actuate the valve drivers.

Valves that operate directly at the nozzle or by means of a flexible cable or rod have shown poor reliability. In addition, manufacturing costs have been high and low frequency response is also found in such devices.

Another type of drop on demand printer produces relatively small characters, for example, document printers. These devices use the surface tension of the orifice as the valving mechanism. Surface tension at the orifice (nozzle) provides the necessary valving after droplet ejection. It absorbs the recoil of the ink drop momentum to stop the ink from leaking and holds the fluid at the orifice while the ink chamber is being refilled. To accomplish this result, however, the orifice used must be small (usually below 60 microns) and the surface tension of the fluid must be high. This small orifice approach precludes the use of these devices for producing large drops and, consequently, large character printing.

The present invention, although suitable for producing small drops and small characters, has a particular advantage with respect to large character printing. Because high surface tension pressure is not required, the size of the orifices can be larger and therefore capable of producing larger drops. Furthermore, these larger orifices can easily be closely spaced to form a single nozzle; the drops from such individual orifices combine to form an even larger drop.

Other advantages of the present invention over prior art include a relatively high frequency response (greater than 500 drops/sec); and positive, locally generated, pressure pulses rather than a remote pressure source assuring better control and fewer operating problems.

Finally, the present invention is susceptible of a low-cost construction employing a series of plates permitting inexpensive photo-etch fabrications, and diffusion bonding joining.

It is accordingly an object of the present invention to obtain the benefits of these advantages over the known art.

SUMMARY OF THE INVENTION

The invention discloses a simple mechanism for drop on demand printing. A chamber is defined, as by a structure consisting of several parallel plates secured to a mounting block. An outer plate has one or more openings comprising a nozzle; a second plate, spaced from the first to define the chamber, serves as a diaphragm. The diaphragm has an opening for communicating to the chamber defined between the plates. When it is desired to eject a drop through the nozzle, a ball or mass of appropriate diameter, relative to the opening in the diaphragm, is propelled toward the opening with sufficient force and velocity to seal the opening and simultaneously displace the diaphragm sufficiently to pressurize the fluid in the chamber and eject a drop therefrom through the nozzle. The ball is driven by a driver or hammer wire of the type commonly associated with commercially available impact printers.

The mass or ball may be positioned adjacent the diaphragm opening in any of several ways as shown in the accompanying drawings and as described in connection therewith.

DETAILED DESCRIPTION OF THE DRAWINGS

FIG. 1 is a side elevational view in section of a first embodiment of the invention in which a ball is secured to a drive wire for movement therewith and a plurality of apertures are combined to produce a large drop nozzle.

FIG. 2 discloses a variation on the FIG. 1 embodiment in which guide elements are provided for the ball and a single large nozzle is employed.

FIG. 4 illustrates in greater detail the manner in which the embodiment of FIG. 1 can be built up from a series of plates.

FIG. 5 shows the manner in which the embodiment of FIG. 3 can be built up from a series of plates.

FIG. 6 illustrates a further embodiment of the invention in which a molded mass is employed instead of a ball as the drop generating element.

FIG. 7 is an exploded view of a number of annular plates which may be combined to form the structure shown in FIG. 4.

FIG. 8 is a plan view showing layout of a multiple nozzle printer which can be fabricated according to the teachings of the present invention.

FIG. 9 is a side elevational view in section of the FIG. 8 embodiment illustrating the elongated chamber design.

FIG. 10 illustrates ink distribution plates suitable for use with the invention.

DETAILED DESCRIPTION

Figure 1:
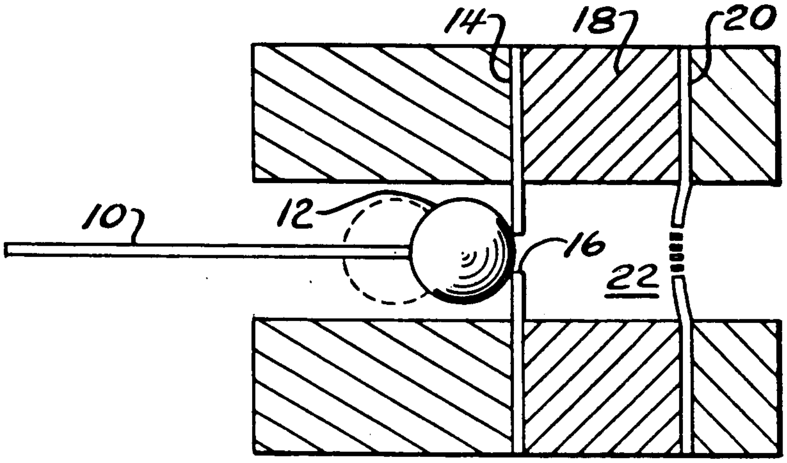
Figure 2:
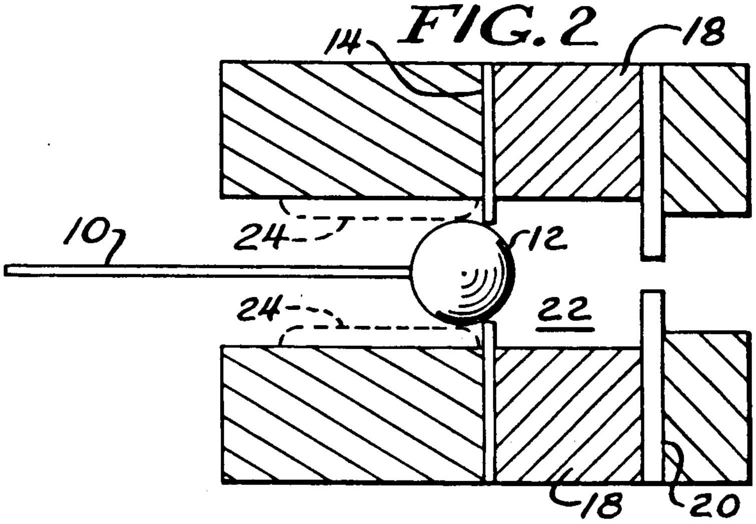

Referring to FIG. 1 and 2, the basic concepts of the present invention are illustrated. A wire or rod 10 is attached to a ball 12 adjacent a flexible diaphragm 14 which diaphragm has an opening 16 centrally located therein.

A chamber is defined by the diaphragm 14, mounting elements 18 and an orifice plate 20. The orifice plate 20 has at least one aperture therein for ejecting ink from the thus defined chamber 22 under the conditions to be described.

When it is desired to produce a drop of ink, the ball which is secured to the wire 10 is propelled to the right as shown in FIGS. 1 and 2 to impact the flexible diaphragm thereby to seal the opening 16 and to compress the volume of marking fluid within the chamber 22. The ball 12 comprises a mass that has a tapered portion which fits into and has a cross-sectional area that coincides with the shape of the opening 16. The result is that ink is ejected from the orifice plate. When the ball is retracted from the opening, the chamber refills with ink from a supply through the opening 16.

As will be readily apparent and in contrast to the prior art, the present invention constitutes a normally open valve. This allows the chamber to communicate with an ink supply whenever drops are not being generated. When, however, it is desired to generate a drop, the chamber is sealed by the action of the ball. The flexure of the diaphragm creates a positive pressure in the chamber 22 to eject drops therefrom.

The differences between FIGS. 1 and 2 are readily apparent. In the FIG. 1 embodiment, a number of small apertures are provided in the orifice plate 20 generating a number of small drops which then combine to produce a larger drop as the ink is ejected through the openings. In the FIG. 2 embodiment, a single larger opening is provided and, in addition, guide fins 24 are provided to ensure that the ball accurately impacts the center of the diaphragm to seal the opening thereat. Alternatively, a guide hole through a plate can be employed.

Figure 3:
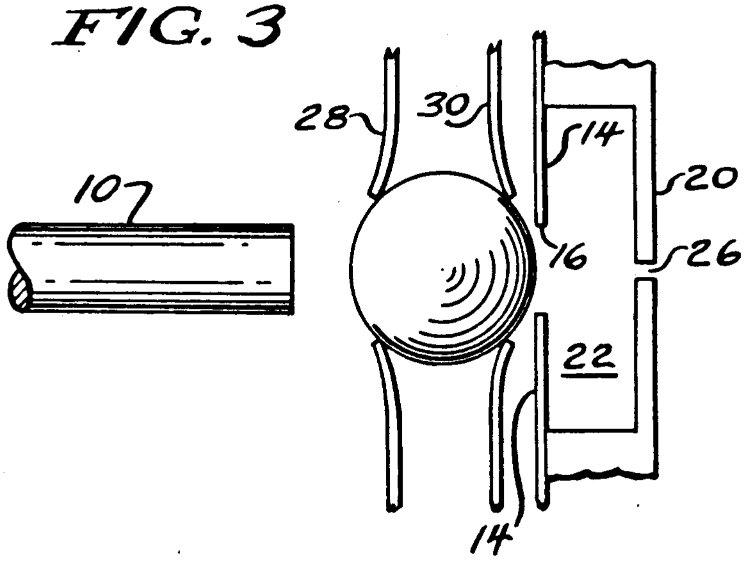
FIG. 3 is a similar view to FIG. 1 of another embodiment of the invention in which the ball is suspended adjacent the diaphragm opening by spring elements.

Referring to FIG. 3, there is shown a second embodiment of the invention. In this embodiment, the ball 12 is still operated by the drive wire 10 and the diaphragm 14 has a central opening 16 adapted to be sealed by the ball 12 when driven by the wire.

However, instead of attaching the ball to the wire 10, the ball is positioned or suspended between two radial springs 28 and 30. The ball moves to the right as shown in FIG. 3 when the wire hammer strikes it. As with the prior embodiments, this causes it to cover the diaphragm aperture and provide the compression needed to eject a drop from the orifice plate. The ball is returned to its rest position by the action of the springs after the wire has been retracted.

Summarizing, the present invention contemplates using an impact mass such as the ball 12 to force or eject ink droplets from a printhead orifice. Ink is confined behind the orifice within a primary ink chamber. While the walls of the chamber are generally rigid, the diaphragm wall is flexible thereby to create pressure when impacted by the mass. The primary chamber 22 is connected to any suitable ink supply through the opening in the diaphragm. The ball or other mass is normally spaced a predetermined distance from the diaphragm so that the opening 16 permits fluid to flow from the ink supply to the primary chamber. The combined action of hammering the fluid and restricting the size of the chamber by closing the aperture has been found to optimize the formation of large droplets at relatively high repetition rates (up to at least 500 Hz), features not obtainable in the prior art. The size of the opening 16 in the diaphragm is somewhat important since the shape of the impact mass must be matched carefully to ensure a proper closure upon actuation.

Referring to FIG. 4, a preferred manner of implementing the embodiment of FIG. 1 is illustrated. For simplicity, only half of the structure is illustrated to the right of the center line. It will be understood by those skilled in the art that identical structure would appear to the left of the center line. The drive wire 10 typically has a diameter of approximately 0.005 to 0.007 inches. These wires are driven by solenoids which cause the wires to reciprocate as a function of a control signal. Such drivers are commercially available devices commonly used on impact printers. Exemplary of drivers which can be used with the present invention are the LEDEX Model 515 single wire solenoid and the STAR DP-830 nine-wire printhead manufactured by LEDEX, Inc. and Star Micronics, Inc. The devices were modified by taking out a section of the support structure to permit the wires to protrude beyond their guides as is required for attachment to the ball of the present invention or for correct positioning in connection with the FIG. 3 embodiment. In the case of the FIG. 1 embodiment, the drive wire is secured to the ball 12 by any suitable means such as by adhesive bonding, welding or similar techniques. The ball is preferably made of ruby, sapphire or molded rubber and has a diameter matched to the opening of the diaphragm 14. As an example only, a device according to the present invention was successfully built in which the ball had a diameter of 0.060 inches for use in conjunction with a diaphragm having an opening of 0.020 to 0.030 inches.

As shown in FIG. 4, the printhead of the present invention can be built up from a series of plates. Thus, a number of clamping blocks, such as 30 shown in FIG. 4, are used to secure the orifice plate 20 and the diaphragm plate 14. To complete the assembly, an additional plate (not shown) is added to create a reservoir 32 to provide a supply of ink to the chamber 22 via the opening 16. As thus configured, it is only necessary to drive the wire 10 reciprocally to cause the ball to repetitively seal and unseal the opening 16 ejecting a drop through the nozzle 26 during each actuation.

Referring to FIG. 7, the plate construction contemplated for the present invention is shown in greater detail. In FIG. 7, there are a series of plates having central openings therein. There are three clamping blocks, 34, 36 and 38, between which are sandwiched the orifice plate 20 and the diaphragm plate 14. The orifice plate carries the aperture 26 through which the ink is ejected. The diaphragm plate carries the opening 16 which is controlled by the operation of the ball 12. The top plate 38 includes an opening therethrough sufficiently large to permit entry of the wire and ball to an operable position relative to the opening 16. The plates are secured on appropriate blocks and, as indicated previously, the upper plate 38, in conjunction with additional housing structure, forms an ink enclosure above the diaphragm plate 14 to which a supply of ink is provided.

Referring to FIG. 5, the FIG. 3 embodiment is shown in greater detail. As with FIG. 4, only half of the actual construction is shown to the right of the center line. In this embodiment, the ball 12 is suspended above the opening 16 in the diaphragm plate. The ball and the wire are preferably not attached. The ball is suspended on two radial springs formed by plates 28 and 30, permitting it to move up and down as the wire strikes it. Thus, the ball can move down to the diaphragm to seal the opening and provide the compression needed to eject a drop from the orifice. The ball is returned to its rest position by the spring action after the wire has been retracted.

FIG. 6 shows a further embodiment of the invention in which the ball is replaced by a molded mass 40. Element 40 has a centrally located hemispherical position and is preferably molded as a single plate. It is secured to the mounting blocks in the same way as the orifice and diaphragm plates. The hemispherical portion of the mass 40 serves the same function, when attached to the wire or when struck by the wire, as the ball of the other embodiments. In fact, the molded mass 40 may be considered to be a combination and extension of the prior two embodiments. The advantage of this embodiment over the prior embodiments is the ease of alignment, and rate control.

As is true of both the FIG. 5 and FIG. 6 embodiments, high frequencies can be obtained because the return rate (of the molded mass) or the spring rate of the springs 28 and 30 can be chosen independently to optimize frequency response. Other advantages of the FIG. 5 and 6 embodiments over the FIG. 4 embodiment include that the ball does not have to be drilled and adhered to the wire making it less expensive and widening the choice of materials. In addition, the alignment of the ball and diaphragm orifice are automatically resolved during plate assembly. An additional advantage of the molded mass embodiment of FIG. 6 is that the mass functions as a sealing membrane to help prevent leakage.

Referring to FIG. 8, a final embodiment of the invention is illustrated, suitable for use where it is desired to create multiple nozzle printheads. Specifically, FIG. 8 discloses a nine-nozzle printhead. Each "nozzle" consists, in fact, of a grouping of three small openings shown enlarged at A in FIG. 8. As best shown in FIG. 9, each nozzle trio 40 is supplied with ink from an elongated chamber 42 disposed on one side of a diaphragm 44 which has an opening 46 therethrough to receive a supply of ink. As with the previous embodiments, a ball or mass 48 is driven by a wire 50 is utilized to close the opening 46 and eject ink from the channel 42 through the nozzles 40.

Referring again to FIG. 8, it will be seen that in order to provide an array of nine such nozzles, it is necessary to have a corresponding number of chambers 42 of varying length and configuration. The ball and wire mechanisms are located remotely from the nozzles. In the case of the FIG. 8 embodiment, they are located within the circles indicated at 52 on the periphery of a plate 54. Each driver mechanism is spaced from the other by approximately 40 degrees around the circumference of the plate 54. This size and spacing is intended to match a standard nine-wire matrix printhead driver utilized for impact matrix printing. The pressure impulses occur in the chambers at the outer perimeter of plate 54 and travel through the channel 42 to the orifice array where they eject an ink drop. While three orifices are shown in FIG. 8, it is understood that a greater or lesser number can be used as desired for a specific style and size of ink drop. Each of the nozzles in the array can be activated independently at high frequencies to produce characters on a substrate that is in motion.

The range of orifice sizes which are useful in conjunction with the present invention are within the range of 0.0015 inches to 0.015 inches. The orifice size is limited on the large side by the surface tension of the liquid and on the small side by the size of a useful drop that can be ejected. The design of the chambers is chosen so that the pressure required to refill the chamber after drop ejection is considerably lower than the pressure available from the nozzle. This can be accomplished by ensuring that the diaphragm aperture and chamber are large to ensure the free flow of fluid without significant pressure drop.

The diaphragm plates for the embodiments disclosed herein can be made from a variety of materials as, for example, stainless steel or more flexible materials such as mylar. The material chosen will be a function of the size of the orifice desired and the frequency at which the device is intended to operate.

Ink distribution can be accomplished by a number of different techniques, again depending upon the desires of the designer. A typical solution would be to use ink distribution channels provided in plates which are mounted to the assembly in the manner previously described herein. FIG. 10 shows two such plates, having channels therein, by which ink can be supplied from large reservoirs to the diaphragm opening. Alternatively, the ink supply can be in line in a direction parallel to the wire, rather than laterally as shown in FIG. 10.

Any number of fluids are suitable for use with the present invention including hot melt inks, adhesives and the like.

While the principles of this invention have been described above in connection with a specific embodiment thereof, it is to be understood that various changes in form and detail can be made without departing from the true spirit and scope of the claimed invention.

What is claimed is:

1. An impact-valve for drop formation comprising:

(a) means defining a chamber for receiving a supply of fluid, said chamber having an outlet through which said fluid can be ejected therefrom and a planar wall having an aperture therethrough to define an inlet through which said fluid can enter said chamber;

(b) means for sealing said inlet to pressurize the fluid in said chamber to eject fluid drops from said outlet, and thereafter for unsealing said inlet to permit refilling of said chamber without permitting air to enter said chamber by way of said outlet, said means comprising:

(i) a substantially rigid mass having a tapered portion dimensioned to form a seal with said inlet when in contact therewith, and;

(ii) means for reciprocatingly driving said tapered portion into and out of sealing engagement with said inlet.

2. The device of claim 1 wherein said means for driving includes a wire, one end of which is positioned adjacent said mass, and means for reciprocating said wire toward and away from said inlet.

3. The device of claim 2 wherein said wire is secured to said mass for movement therewith.

4. The device of claim 1, wherein said mass is a sphere.

5. The device of claim 1, wherein said mass includes a centrally located hemispherical portion.

6. The device of claim 1, wherein said means for driving said mass includes means for resiliently positioning said mass adjacent, but out of sealing engagement with said chamber inlet.

7. The device of claim 2, wherein said means for driving said mass further includes means for resiliently positioning said mass adjacent said chamber inlet, said wire driving the mass into sealing engagement with said inlet to eject fluid, said positioning means returning said mass to the unengaged position thereafter.

8. The device of claim 6, wherein said means for resiliently positioning said mass includes a pair of spaced apart radial springs which position the mass adjacent said inlet.

9. The device of claim 2, wherein said reciprocating means is a solenoid-operated wire driver.

10. The device of claim 1, wherein said chamber is formed from at least two substantially parallel, spaced apart plates secured to a mounting means, a first plate having an opening defining said outlet and a second plate having an opening defining said inlet.

11. The device of claim 1, wherein said outlet comprises a plurality of closely spaced openings, the fluid ejected from said openings combining to form a large drop.

12. A printhead for drop on demand marking, comprising:

(a) an impact valve including:

(i) means defining a chamber for receiving a supply of fluid, said chamber having an outlet through which said fluid can be ejected therefrom and a planar wall having an aperture therethrough to define an inlet through which said fluid can enter said chamber;

(ii) means for sealing said inlet to pressurize the fluid in said chamber to eject fluid drops from said outlet, and thereafter for unsealing said inlet to permit refilling of said chamber without permitting air to enter said chamber by way of said outlet, said means comprising:

(1) a substantially rigid mass having a tapered portion dimensioned to form a seal with said inlet when in contact therewith, and;

(2) means for reciprocatingly driving said tapered portion into and out of sealing engagement with said inlet.

(b) means for supplying marking fluid to said chamber, and;

(c) means for controlling said sealing and unsealing means to eject marking fluid on demand.

13. The device of claim 12 wherein said means for driving includes a wire, one end of which is positioned adjacent said mass, and means for reciprocating said wire toward and away from said inlet.

14. The device of claim 13 wherein said wire is secured to said mass for movement therewith.

15. The device of claim 12, wherein said means for driving said mass includes means for resiliently positioning said mass adjacent, but out of sealing engagement with said chamber inlet.

16. The device of claim 13, wherein said means for driving said mass further includes means for resiliently positioning said mass adjacent said chamber inlet, said wire driving the mass into sealing engagement with said inlet to eject ink, said positioning means returning said mass to the unengaged position thereafter.

17. The device of claim 12, wherein said chamber is formed from at least two substantially parallel, spaced apart plates secured to a mounting means, a first plate having an opening defining said outlet and a second plate having an opening defining said inlet.

18. The device of claim 12, wherein said outlet comprises a plurality of closely spaced openings, the fluid ejected from said openings combining to form a large drop.

19. A printhead array for drop on demand marking, comprising:

(a) a plurality of impact valves, each of which includes:

(i) means defining a chamber for receiving a supply of fluid, said chamber having an outlet through which said fluid can be ejected therefrom and a planar wall having an aperture therethrough to define an inlet through which said fluid can enter said chamber;

(ii) means for sealing said inlet to pressurize the fluid in said chamber to eject fluid drops from said outlet, and thereafter for unsealing said inlet to permit refilling of said chamber without permitting air to enter said chamber by way of said outlet, said means comprising:

(1) a substantially rigid mass having a tapered portion dimensioned to form a seal with said inlet when in contact therewith, and;

(2) means for reciprocatingly driving said tapered portion into and out of sealing engagement with said inlet;

(b) means for supplying marking fluid to said chamber, and;

(c) means for controlling said sealing and unsealing means to eject marking fluid on demand.

20. The device of claim 19 wherein said means for driving includes a wire, one end of which is positioned adjacent said mass, and means for reciprocating said wire toward and away from said inlet.

21. The device of claim 20 wherein said wire is secured to said mass for movement therewith.

22. The device of claim 19, wherein said means for driving said mass includes means for resiliently positioning said mass adjacent, but out of sealing engagement with said chamber inlet.

23. The device of claim 20, wherein said means for driving said mass further includes means for resiliently positioning said mass adjacent said chamber inlet, said wire driving the mass into sealing engagement with said inlet to eject fluid, said positioning means returning said mass to the unengaged position thereafter.

24. The device of claim 19, wherein said chamber is formed from at least two substantially parallel, spaced apart plates secured to a mounting means, a first plate having an opening defining said outlet and a second plate having an opening defining said inlet.

25. The device of claim 19, wherein said outlet comprises a plurality of closely spaced openings, the fluid ejected from said openings combining to form a large drop.

26. An impact-valve for drop formation, comprising:

(a) means defining a chamber adapted to receive a supply of fluid, said chamber having an outlet through which the fluid can be ejected and an inlet through which the fluid can enter the chamber;

(b) means for sealing the inlet and pressurizing the fluid in the chamber to eject fluid drops from the outlet, said means for sealing and pressurizing comprising:

(i) a mass dimensioned to seal the inlet when in contact therewith, and;

(ii) means for driving the mass into sealing engagement with the inlet to pressurize the fluid and eject it from the chamber, said means for driving including a pair of spaced apart radial springs for resiliently positioning the mass adjacent, but out of sealing engagement with, the chamber inlet.

* * * * *